Sept. 9, 1930.   V. C. ARMSTRONG   1,775,382
RAIL JOINT BAR
Filed Nov. 20, 1929   3 Sheets-Sheet 1
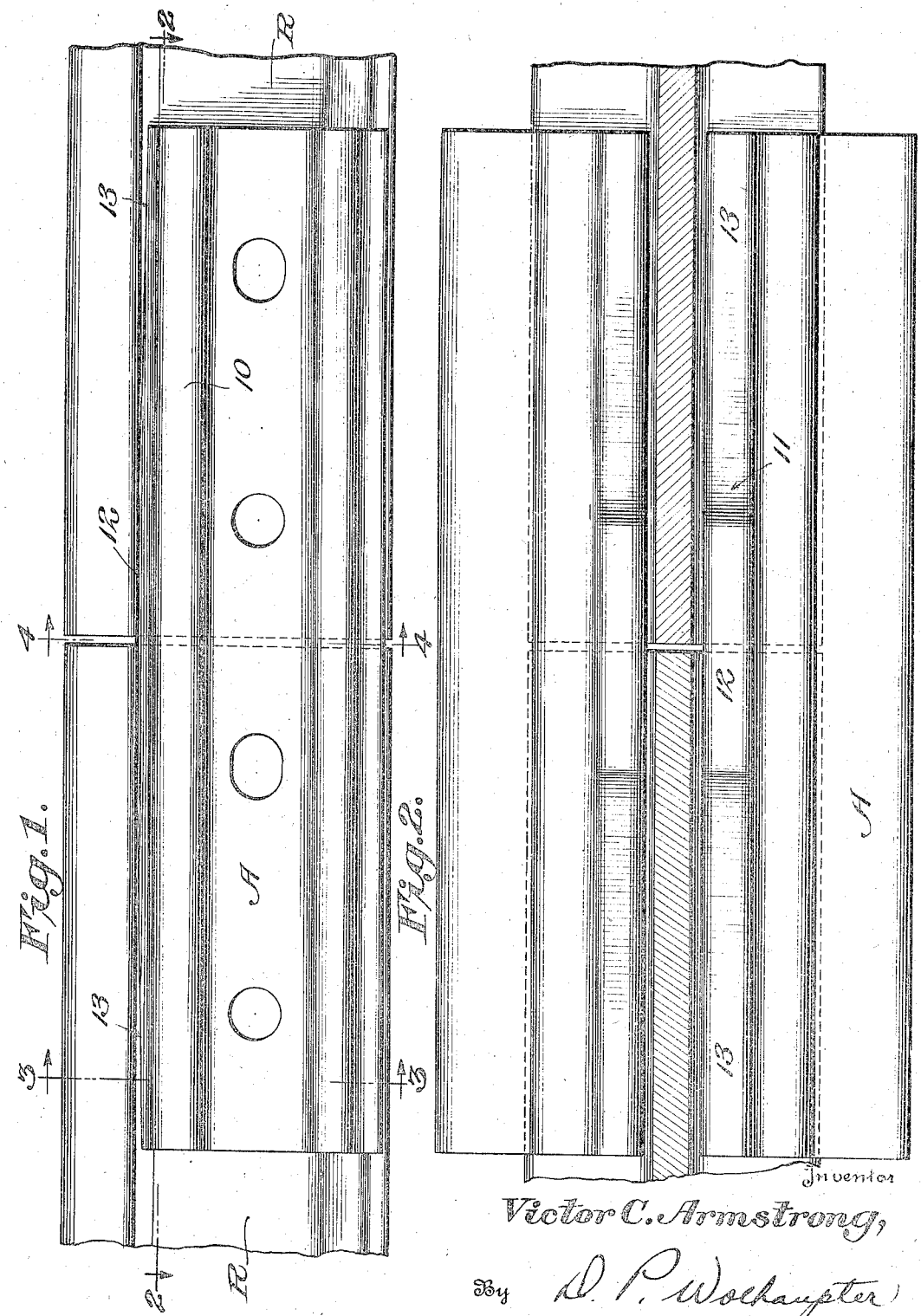
Victor C. Armstrong,
By D. P. Wolhaupter
Attorney

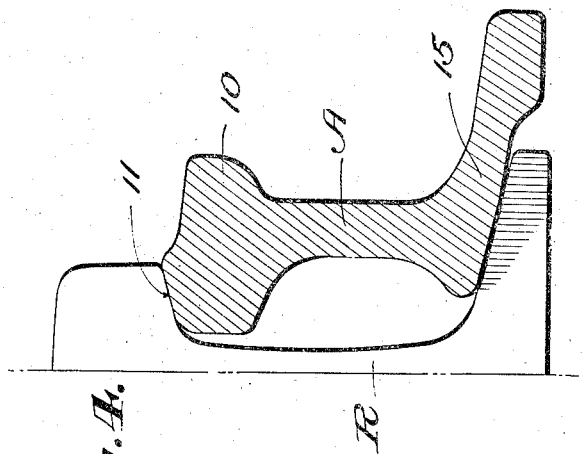
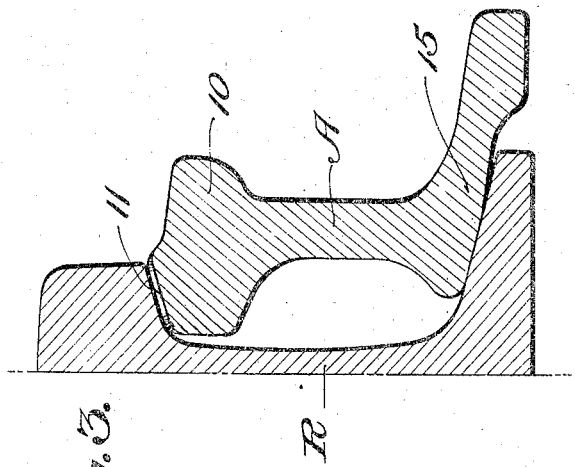
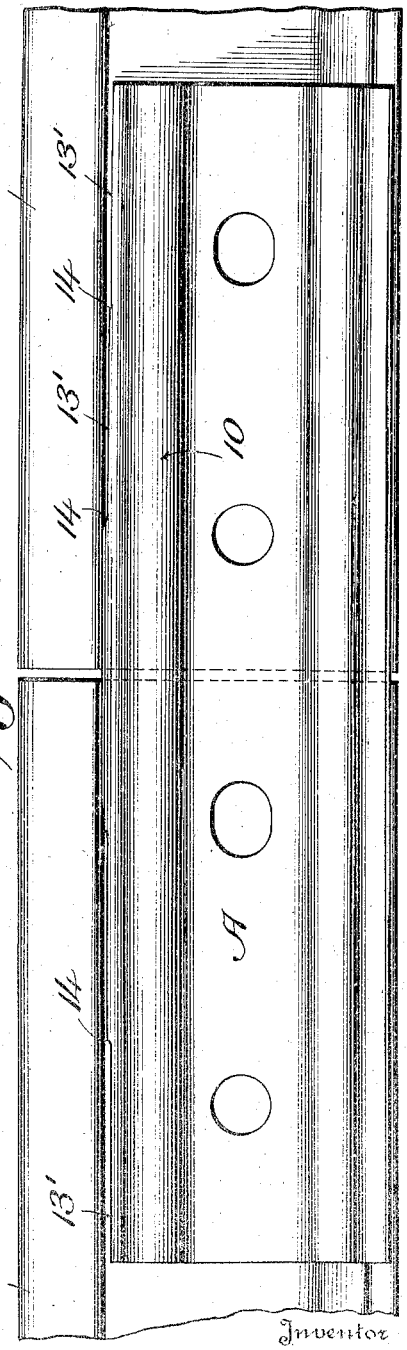

Sept. 9, 1930.  V. C. ARMSTRONG  1,775,382
RAIL JOINT BAR
Filed Nov. 20, 1929   3 Sheets-Sheet 3
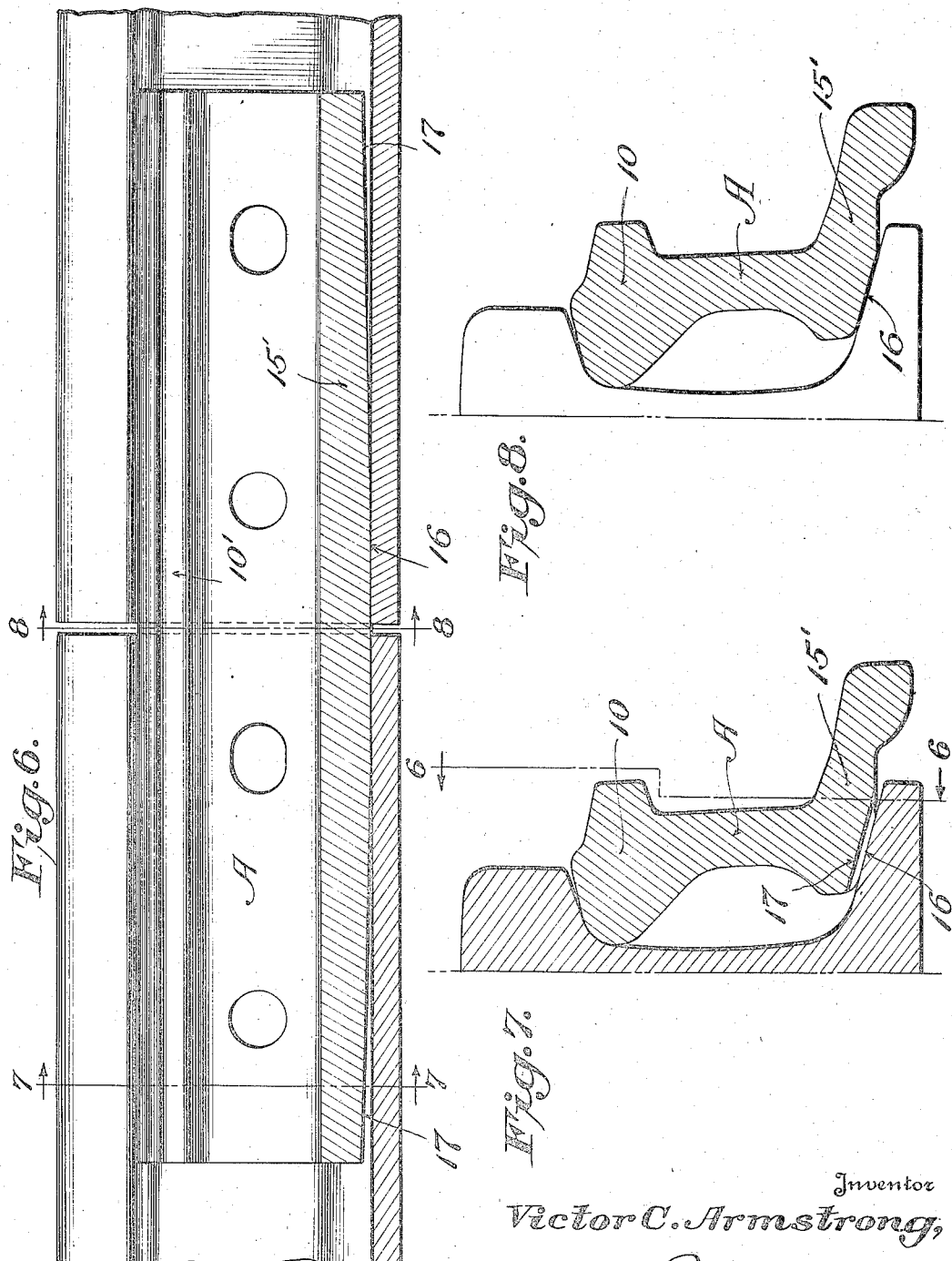
Inventor
Victor C. Armstrong,
By D. P. Wolhaupter
Attorney Patented Sept. 9, 1930

1,775,382

UNITED STATES PATENT OFFICE

VICTOR C. ARMSTRONG, OF HACKENSACK, NEW JERSEY, ASSIGNOR TO THE RAIL JOINT COMPANY, OF NEW YORK, N. Y., A CORPORATION OF NEW YORK

RAIL-JOINT BAR

Application filed November 20, 1929. Serial No. 408,625.

This invention relates to improvements in rail joint bars for connecting together the meeting ends of railway rails, and has particular reference to a joint bar especially designed for adjustment to compensate for wear.

It has been found to be a condition in railroad track that the head contact type of joint bar has its most effective fishing engagement with the underside of the rail head for only a part of its length at each side of the joint between the rail ends. This effective fishing area necessarily varies in extent in different joints and in different track locations, but in some cases extends approximately from eight to twelve inches back from the rail ends. Where that condition exists this medial portion of the bar head necessarily is subjected to the greatest wear, and, in fact, wears down to a material degree while the end portions of the bar remain substantially unworn and in tight fishing engagement with the rail heads. Consequently, these substantially unworn bearing or fishing surfaces of the bar head will prevent inward adjustment of the bar, to compensate for the medial wear, and that wear will increase under the pounding action of the rail ends until the efficiency of the bar is quickly destroyed, making it unsatisfactory even for re-forming.

Therefore, it is the purpose of the present invention to provide a novel joint structure which will permit progressive adjustment of the bar to be made, to compensate for the wear as it occurs in the medial portion thereof, so that the latter can be maintained in fishing contact with the underside of the rail heads until no further space is permitted for inward adjustment of the bar under the tightening of the bolts. To that end the invention contemplates a bar construction which provides for a medial or central fishing contact surface on the head of the bar which not only has an initial contact with the rail heads, but also has a progressive contact as the inward adjustment of the bar takes place, while the remaining end portions of the bar head have an initial easement or clearance from the underside of the rail heads. Consequently, when substantial wear occurs in the said medial portion of the bar head and the bolts are tightened, the end easement or clearance surfaces of the bar permit this inward adjustment to maintain the medial contact, and progressively come into solid fishing contact with the underside of the rail heads until no further adjustment can be made, thus contributing to the fishing efficiency and life of the bar.

It is also the purpose of the invention to apply its novel principle of compensating for wear not only to a head-contact type of joint bar, but also to the headfree type of joint bar wherein the wear and adjustment take place at the foot of the bar over the base flanges of the rail; and, in adapting the improvements to either of these types of bars it will be understood that it is especially applicable to the heavy or reinforced bar constructions which are rigid and substantially inflexible throughout, so that uniform adjustment inward of the bar may be made without flexing or bending its intermediate or end portions. Thus, the present bar not only embodies the wear compensating feature referred to, but is possessed of ample strength in all of its stages of adjustment to withstand the normal strains to which it may be subjected in use.

In the accompanying drawings, which are illustrative of practical embodiments of the invention, and wherein like characters of reference denote corresponding parts in the different views:—

Figure 1 is a side elevation of a rail joint inclusive of one practical embodiment of a joint bar constructed in accordance with the present invention, the initial clearance between the end portions of the bar and the rails being exaggerated.

Figure 2 is a horizontal section taken approximately on the line 2—2 of Fig. 1, the joint bars being shown in top plan.

Figure 3 is a transverse section on the line 3—3 of Fig. 1.

Figure 4 is a transverse section on the line 4—4 of Fig. 1.

Figure 5 is a view similar to Fig. 1 illustrating an alternative embodiment of the invention.

Figure 6 is a view similar to Figs. 1 and 5, but partly in section, illustrating another embodiment of the invention that is adapted to the headfree type of rail joint.

Figure 7 is a transverse section on the line 7—7 of Fig. 6; and

Figure 8 is a transverse section on the line 8—8 of Fig. 6.

The invention is capable of embodiment in a wide variety of joint bars of specifically different constructions so long as said bars are possessed of the requirement of sufficient stiffness and rigidity to substantially resist tendency to bend under the tightening strains of the bolts, so in each of the embodiments of the invention illustrated in the accompanying drawings it will be observed that the joint bar, designated generally as A, is preferably of the reinforced type of construction with the outer reinforcing rib 10 formed thereon, though other designs and shapes of bars can be adapted to the invention provided the same possess the requisite rigidity.

With particular reference to the embodiment of the invention illustrated in Figs. 1 to 4, it will be noted that the bar A is inclusive, as usual, of a head fishing surface 11 which is adapted for contact with the under faces of the heads of the rails R, R, said surface in accordance with the invention, being suitably formed to provide a medial portion 12 of any desired length for initial rail head contact, and other portions 13, 13, extending from the medial portion 12 to the ends of the bar, for initial rail head clearance. As illustrated in Fig. 1, the portions 13, 13 of the fishing surface 11 are slightly inclined downwardly from the medial portion 12 to the ends of the bar, with the result that in the initial applied position of the bar, the medial portion 12 is in contact with the rail heads and the space between the portions 13, 13 and the rail heads is of gradually increasing depth towards the ends of the bar. Thus, as the medial portion 12 wears, the joint bolts may be tightened to draw the bar inwardly to take up any play produced as a result of the wear, and, as is manifest, as wear occurs and the bar is progressively adjusted inwardly, the effective rail head contacting area of the surface 12 is not only maintained but also is progressively increased, i. e., lengthened until, finally, the head surface of the joint bar is in contact with the rails throughout the length of the bar. When, after long use, this latter condition is established and it is no longer possible to compensate for wear upon the medial portion of the fishing surface 11, which is where the greatest wear always occurs, the bar may be discarded or suitably re-formed to its original condition.

As illustrated in Fig. 5 of the drawings, the head clearance portions 13', 13' of the fishing surface of the bar, corresponding to the portions 13, 13 of the embodiment of the invention shown in Fig. 1, may be provided by forming said portions in a series of slight steps 14. Otherwise the bar is of the same construction and is adapted to operate in the same manner as the bar illustrated in Figs. 1 to 4.

According to the embodiments of the invention illustrated in Figs. 1 to 5, the foot or rail flange fishing portion 15 of the present bar, preferably is formed flat and straight throughout the length of the bar, it being understood, of course, that it is through the wedging action of this base fishing portion 15 against the inclined upper faces of the base flanges of the rails that the bar is elevated by inward adjustment thereof to cause the head fishing surface 11 to compensate for wear in the manner stated and, of course, in this connection it is further understood that the design of the bar must be such as to permit all necessary elevation of the bar to compensate for wear until the head fishing surface 11 is in contact with the rail heads throughout the length of the bar.

It is well known that in rail joints, the center portion of the joint bar is subject to initial and maximum wear, due to the wave motion action of the rail ends under the influence of traffic passing over the rails. Heretofore, it has been proposed to provide a joint bar of sufficiently light weight to enable same to be flexed or sprung by tightening of the joint bolts to take up any play and thus to compensate for such wear, but according to all such proposals weight and strength have been sacrificed for the sake of adjustability, so that the advantages gained on the one hand have not been found to compensate for the disadvantages or losses occasioned on the other hand. However, by reason of the inherent stiffness of the present bar, rendering same resistant to bending or flexing by tightening of the joint bolts, and by reason of the bar being constructed as described, a joint effected by means of said bar not only is at least of equal strength to any ordinary joint, but possesses the added advantage that any play resulting from wear of the medial fishing surfaces of the joint may readily and effectively be taken up simply by tightening the joint bolts, and the head contact of the bar at its central or medial portion maintain under all adjustments, with the undersides of the rail head ends.

Figs. 6 to 8 of the drawings illustrate the invention embodied in a joint bar of the well known "headfree" type, that is, a joint bar which has loading engagement at its head solely with the head fillets of the rails. Experience has proven that in a headfree bar practically no wear occurs at the head of the bar, substantially all wear occurring at the bottom fishing surface of the bar where it contacts with the upper surfaces of the base flanges of the rails. Therefore, in incorporating the invention in a joint bar A of the headfree type, the bar as previously stated is formed of such weight and inherent rigidity as to be resistant to bending or flexing by tightening of the joint bolts, but the head 10' of the bar is formed straight for continuous contact throughout the length of the bar with the head fillets of the rails, and the base fishing flange 15' of the bar is suitably formed by inclining or stepping same as explained in connection with the head fishing surfaces of the bar illustrated in Figs. 1 and 5. In other words, when the invention is incorporated in a bar of the headfree type, and when that bar is incorporated in a rail joint, there is an initial contact of the medial portion 16 of the base fishing flange of the bar with the upper faces of the rail flanges, and initial clearance between the base flanges of the rails and the portions 17, 17 of the base fishing flange of the bar extending from the medial portion 16 to the ends of the bar. This clearance space is of progressively increasing depth towards the ends of the bar as shown, with the result that the bar is adapted for inward adjustment at its base to compensate for wear in the same manner as set forth in connection with the embodiments of the invention illustrated in Figs. 1 to 5.

Without further description it is thought that the features and advantages of the invention will be readily apparent to those skilled in the art, and it will of course be understood that changes in the form, proportion and minor details of construction may be resorted to, without departing from the spirit of the invention and scope of the appended claims.

I claim:—

1. A rigid joint bar inclusive of a fishing surface inclined towards the ends of the bar to provide a medial portion for initial rail contact and portions extending from said medial portion to the ends of the bar for initial rail head clearance, said bar being adapted for progressive inward adjustment with respect to the meeting ends of a pair of rails to compensate for wear and to provide a rail contacting surface of progressively increasing length until the length of said surface is equal to the length of the bar.

2. A rigid joint bar inclusive of a fishing surface having a medial portion for initial rail contact and portions extending from said medial portion to the ends of the bar for initial rail clearance whereby the bar is adapted to be adjusted progressively inwardly to compensate for wear, the medial portion of said fishing surface being adapted initially and by progressive inward adjustment of the bar to have rail contact and the portions of said fishing surface extending from said medial portion to the ends of the bar being adapted by inward adjustment of the bar to be brought progressively into contact with the rails until the fishing surface of the bar has rail contact throughout the length of the bar.

3. A rigid joint bar inclusive of a fishing surface having a medial portion for initial rail contact and portions extending from said medial portion to the ends of the bar for initial rail clearance of progressively increasing depth from the rails towards the ends of the bar, whereby the bar is adapted to be adjusted progressively inwardly to compensate for wear, the medial portion of said fishing surface being adapted initially and by progressive inward adjustment of the bar to have rail contact and the portions of said fishing surface extending from said medial portions to the ends of the bar being adapted by inward adjustment of the bar to be brought progressively into contact with the rails until the fishing surface of the bar has rail contact throughout the length of the bar.

4. A rigid joint bar inclusive of a fishing surface having a medial portion for initial rail contact and portions extending from said medial portion to the ends of the bar for initial rail clearance whereby the bar is adapted to be adjusted progressively inwardly to compensate for wear, and to provide a rail contacting surface of progressively increasing length until the length of said surface is equal to the length of the bar.

In testimony whereof I hereunto affix my signature.

VICTOR C. ARMSTRONG.